US008524184B2

(12) United States Patent
Iyengar et al.

(10) Patent No.: US 8,524,184 B2
(45) Date of Patent: Sep. 3, 2013

(54) SULFUR RECOVERY PLANT TAIL GAS TREATMENT PROCESS

(75) Inventors: Jagannathan N. Iyengar, Centreville, VA (US); David Perry, Alexandria, VA (US); Robert B. Fedich, Long Valley, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 346 days.

(21) Appl. No.: 12/825,865

(22) Filed: Jun. 29, 2010

(65) Prior Publication Data

US 2011/0008229 A1 Jan. 13, 2011

Related U.S. Application Data

(60) Provisional application No. 61/270,406, filed on Jul. 8, 2009.

(51) Int. Cl.
*B01D 53/50* (2006.01)
*B01D 53/52* (2006.01)

(52) U.S. Cl.
USPC ............... 423/228; 423/242.4; 423/242.7

(58) Field of Classification Search
USPC ............ 423/220, 228, 242.1, 242.2, 242.4, 423/242.7
See application file for complete search history.

(56) References Cited

U.S. PATENT DOCUMENTS

| 3,752,877 A | 8/1973 | Beavon |
| 3,847,570 A | 11/1974 | Gunther |
| 4,112,052 A | 9/1978 | Sartori et al. |
| 4,170,628 A * | 10/1979 | Kosseim et al. ........... 423/242.4 |
| 4,405,578 A | 9/1983 | Sartori et al. |
| 4,405,581 A | 9/1983 | Savage et al. |
| 4,405,585 A | 9/1983 | Sartori et al. |
| 4,417,075 A | 11/1983 | Stogryn |
| 4,471,138 A | 9/1984 | Stogryn |
| 4,487,967 A | 12/1984 | Stogryn |
| 4,508,692 A | 4/1985 | Savage et al. |

(Continued)

FOREIGN PATENT DOCUMENTS

EP 0954369 B1 5/2003

OTHER PUBLICATIONS

PCT/US10/40713, PCT International Search Report, Form PCT/ISA/210, dated Aug. 31, 2010 3 pgs.

(Continued)

*Primary Examiner* — Stanley Silverman
*Assistant Examiner* — Daniel Berns
(74) *Attorney, Agent, or Firm* — Glenn T. Barrett; Malcolm D. Keen

(57) ABSTRACT

A process for the removal of hydrogen sulfide from a gas stream in which the gas stream is first passed through a Claus unit operating at a sub-stoichiometric ratio ($H_2S:SO_2$) of greater than 2:1 to produce a tail gas stream comprising less than 2000 vppm $SO_2$. This tail gas stream is then treated to increase the sulfur recovery to at least 99.5% by first directly cooling the tail gas stream by contact with water as a coolant, followed by contacting the gas stream with a circulating stream of a dilute, absorbent solution of a severely sterically hindered secondary aminoether alcohol to further cool the gas stream, and then removing the $H_2S$ from the stream using a stronger absorbent solution of a severely sterically hindered secondary aminoether alcohol.

34 Claims, 1 Drawing Sheet

(56) References Cited

U.S. PATENT DOCUMENTS

| | | |
|---|---|---|
| 4,618,481 A | 10/1986 | Heinzelmann et al. |
| 4,665,234 A | 5/1987 | Stogryn |
| 4,892,674 A | 1/1990 | Ho et al. |
| 4,894,178 A | 1/1990 | Ho et al. |
| 4,895,670 A | 1/1990 | Sartori et al. |
| 4,961,873 A | 10/1990 | Ho et al. |
| 2006/0104877 A1 | 5/2006 | Cadours et al. |

OTHER PUBLICATIONS

PCT/US10/40713, PCT Written Opinion of the International Searching Authority, Form PCT/ISA/237, dated Aug. 31, 2010 6 pgs.

DeTar et al., Calculations of Steric Hindrance in Ester Hydrolysis Based on Estimation of van der Waals Strain Energies of Alkanes, Journal of the American Chemical Society, vol. 98, No. 15, pp. 4567-4571 (Jul. 21, 1976).

DeTar, "Effects of Alkyl Groups on Rates of SN2 Reactions", Journal of Organic Chemistry, vol. 45, No. 25, pp. 5174-5176 (1980).

* cited by examiner

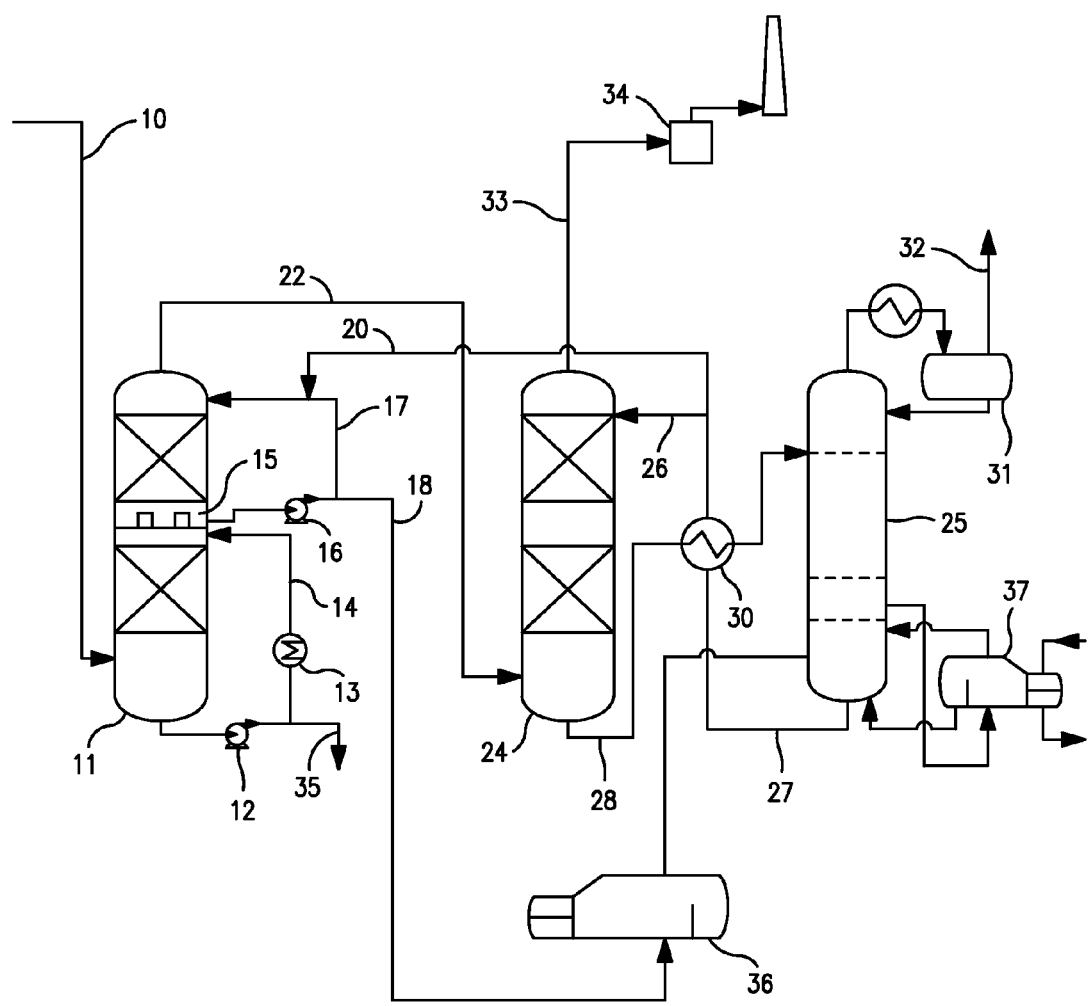

SULFUR RECOVERY PLANT TAIL GAS TREATMENT PROCESS

CROSS REFERENCE TO RELATED APPLICATION

This application relates and claims priority to U.S. Provisional Patent Application No. 61/270,406, filed on Jul. 8, 2009.

FIELD OF THE INVENTION

The present invention relates to a process for extracting sulfur from a gas stream containing sulfur compounds and, more particularly, to a process for desulfurizing the tail gas from a Claus unit

BACKGROUND OF THE INVENTION

Sulfur-containing gas streams in petroleum refineries and natural gas plants are typically desulfurized by the Claus process. The Claus process operates in two major process steps. In the first, hydrogen sulfide is converted to elemental sulfur at temperatures of approximately 1000° C. by the combustion of approximately one-third of the $H_2S$ in the gas stream to produce sulfur dioxide which then reacts with the remaining $H_2S$ to produce elemental sulfur. Following condensation and removal of the molten sulfur formed in this stage, the reaction between the $H_2S$ and the $SO_2$ is continued in the second, catalytic step in which elemental sulfur is produced at temperatures between 200-350° C. over an alumina catalyst. The Claus reaction can be represented by the equations:

$$H_2S + 1.5O_2 \rightarrow SO_2 + H_2O$$

$$2H_2S + SO_2 \rightarrow 3S + 2H_2O$$

As the second reaction is an equilibrium reaction which is favored at lower temperatures, it is carried out in stages with condensation and removal of molten elemental sulfur between each stage, followed by heating to the reaction temperature for the next stage. Typically, there are three stages of catalytic conversions although two stages are also conventional when a tail gas treatment unit is used. With the progressive stagewise removal of the sulfur between stages, the temperature of each stage is reduced to obtain the more favorable thermodynamic equilibrium: typically, the first catalytic stage will be operated at a temperature from 315 to 330° C., the second at about 240° C. and the third, if used, at around 200° C. with the outlet of each stage being maintained at least 20° C. above the dew point of the sulfur to avoid the generation of liquid within the catalyst beds. Operation of the first stage at high temperature ensures hydrolysis of a major portion of COS and $CS_2$; operation of each bed close to the dew point of the sulfur brings conversion closer to the equilibrium value.

The Claus process has been improved over the years mainly by improvements intended to reduce the residual sulfur levels in the tail gas. The basic Claus process will generally produce an overall recovery of 95-97% sulfur but this is no longer considered adequate in most instances, mainly for environmental reasons. The Jacobs COMPRIMO™ SUPERCLAUS™ process, using a special catalyst in the last reactor oxidizes the $H_2S$ selectively to sulfur with air injected into the reactor to avoid formation of $SO_2$, has a sulfur efficiency of around 99.0%, depending on the composition of the Claus feed.

The tail gas from the Claus unit contains residual quantities of sulfur in the form of elemental sulfur, sulfur dioxide, hydrogen sulfide as well as other sulfur-containing compounds such as COS and $CS_2$ which will need to be removed if the highest degree of sulfur recovery is to be attained. In the United States, for example, a minimum sulfur recovery efficiency of 99.8% is required for larger Sulfur Recovery Units (SRUs), so that a tail gas treating unit is required.

Emissions from the Claus process may be reduced by: (1) extending the Claus reaction into a lower temperature liquid phase, (2) adding a scrubbing process to the Claus exhaust stream, or (3) incinerating the hydrogen sulfide gases to form sulfur dioxide. Processes currently available that extend the Claus reaction into a lower temperature liquid phase include Beavon Sulfur Recovery (BSR), BSR/Selectox, Sulfreen, Cold Bed Absorption, Maxisulf, and IFP-1 processes. All of these processes give higher overall sulfur recoveries of 98 to 99 percent when following downstream of a typical 2- or 3-stage Claus sulfur recovery unit.

Sulfur emissions can also be reduced by adding a scrubber at the tail end of the plant, these falling into one of two categories: oxidation tailgas scrubbers such as the Wellman-Lord, Stauffer Aquaclaus, and IFP-2 processes, and reduction tailgas scrubbers. In the reductive type of scrubbing process, sulfur in the tailgas is converted to $H_2S$ by hydrogenation in a catalytic reduction step after which the cooled tailgas is sent to a scrubber for $H_2S$ removal. Processes of this type include the Beavon and SCOT (Shell Claus Off-gas Treating) processes with the SCOT process being the current market leader in Claus tail gas treatment in spite the high capital requirement of the SCOT process, approximately 30 to 50 percent of the cost of the Claus plant itself.

The Beavon process (BSR), described originally in U.S. Pat. No. 3,752,877, heats the Claus tail gas typically to 290-340° C. by combustion of natural gas in an on-line Reducing Gas Generator (RGG) for subsequent catalytic reduction of virtually all non-$H_2S$ sulfur components to $H_2S$ which is then removed by amine scrubbing. Conversion of $SO_2$ and elemental sulfur is by hydrogenation, while CO, COS and $CS_2$ are hydrolyzed.

Various acid gas scrubbing processes are available for $H_2S$ removal. These processes generally use an amine solution to remove the $H_2S$ and possibly other acid gas contaminants by reaction with the amines, after which the amines are regenerated in a separate column and the resulting $H_2S$ returned to the Claus plant feed. The Cansolv process removes sulfur dioxide in a similar manner and recycles regenerated sulfur dioxide to the Claus plant. Among the amine scrubbing processes is the highly effective FLEXSORB™ process, originally developed by Exxon Research and Engineering with its variants, the FLEXSORB SE™ and FLEXSORB SE Plus™ processes using proprietary severely hindered ethanolamine solvents which remove $H_2S$ to levels which are fully compliant with current regulatory requirements.

In summary, therefore, the SuperClaus process is the market-leading technology for 99.0-99.2% recovery. Currently the European Union BREF (Best Available Technology Reference) guidance to refiners is 99.5% sulfur recovery and for this intermediate recovery level, Lurgi's Sulfreen™ technology has been used. There is, however, a significant likelihood that this guidance will be upgraded to a requirement in coming years in view of current and pending legislation in various countries for enforcing 99.5% as a target sulfur recovery level. This exceeds the capabilities of the direct oxidation technology while the cost of a reduction-absorption-recycle unit such as SCOT for 99.5% recovery is prohibitively high. Longer term, it is expected that environmental legislation will continue to drive up sulfur recovery requirements. For 99.9+% recovery, ExxonMobili's FLEXSORB™ SE/SE Plus technology is the market leader. In the light of these expectations, the Sulfreen process, like the SuperClaus technology, is likely to become a regretted investment when the lower sulfur emissions/higher overall sulfur recovery required by future regulation are enforced. Thus refiners face the possibility of "regretted investment" should they choose a sulfur plant tail gas treating technology that can meet current requirements but not easily be upgraded to meet future specifications.

We have now devised a process which utilizes the unique capabilities of the sterically hindered aminoethoxyether sorbents to eliminate the reduction step in the SCOT and similar processes. The resulting process can more economically achieve the intermediate target of 99.5%-99.8% overall recovery and provide a phased-investment strategy for subsequent upgrade to achieve higher recoveries while still maintaining amine consumption in the scrubbing process at an acceptably low level.

SUMMARY OF THE INVENTION

According to the present invention, the tail gas stream from a Claus plant which comprises mostly $H_2S$ and very little $SO_2$ (less than 2000 vppm) is first cooled in a quench column, suitably using water as a coolant, after which the $SO_2$ is absorbed in a circulating stream of a dilute, absorbent solution of a severely sterically hindered aminoether alcohol from which the amine component can be reclaimed in a simple thermal, ion exchange or other reclamation process in which any $SO_2$ or CO based heat stable salts are converted. The gas stream from the quench column may then be treated in a conventional amine tail gas treating unit, preferably using one of the highly hindered aminoethoxyether solvents. Acid gas from the regenerator of the scrubber is recycled back to the front of the Claus unit for sulfur recovery. The overall sulfur recovery for the process may be greater than 99.5% of inlet sulfur.

In comparison with the conventional BSR or SCOT tail gas units, the Reducing Gas Generator (RGG), hydrogenation reactor and the waste heat boiler are eliminated thereby reducing the investment cost of the process scheme so that an upgrade of an existing SRU to 99.9+% sulfur recovery efficiency is a straightforward process investment with a "no regrets" factor. In addition, the following operational advantages are achieved:

(i) No caustic is used in the quench column as the hindered aminoether alcohol is capable of removing $SO_2$ with a purge stream from circulating wash being sent to the thermal reclaimer for recovering the solvent. If MDEA solution is used in the top stage of the BSR quench column or contact condenser, the MDEA will be neutralized by $SO_2$ but cannot be thermally reclaimed. Hence, a caustic solution has been the customary requirement.

(ii) The hindered aminoether alcohol solvents are highly stable and have been shown to have very low reactivity with any elemental sulfur in the vapor stream whereas, primary, secondary and tertiary amine solvents such as DIPA (di-isopropanol amine) or MDEA (methyl-diethanolamine) react with the elemental sulfur to yield polymers that can precipitate and reduce the treating capacity. The hindered aminoether alcohol solvents can tolerate high levels of heat stable salts and still are not as corrosive as other amines.

(iii) The absence of the Reducing Gas Generator eliminates the need for burning fossil fuel to produce hydrogen and, together with the absence of the exothermic hydrogenation reactor, reduces the heat flow to the quench column.

(iv) The quench column (contact condenser) from an existing SCOT or BSR unit may be retained, minimizing capital requirements for the new unit.

DRAWINGS

The single FIGURE of the accompanying drawings is a simplified process flow diagram for the present tail gas treatment process.

DETAILED DESCRIPTION

Tail Gas Treating Unit

The FIGURE shows an illustrative configuration for the present tail gas treatment process. The tail gas from the two- or three-stage Claus plant enters the unit through line 10. At this point, in a conventional BSR or SCOT unit, the tail gas would be routed to a reducing gas generator (RGG) in which hydrogen is produced by the sub-stoichiometric combustion of natural gas for catalytic reduction in a subsequent hydrogenation reactor of virtually all non-$H_2S$ sulfur components. The passage of the Claus tail gas through the RGG typically heats the gas to a temperature of 290-340° C. Alternatively, a tailgas preheater can be used to heat the tailgas and a $H_2$ stream is added for the hydrogenation reactions. Conversion of $SO_2$ and elemental sulfur in the hydrogenation reactor is by hydrogenation, while CO, COS and $CS_2$ are hydrolyzed to $CO_2$ and any CO which is produced would be converted to $CO_2$ by the water gas shift reaction. The heated gas mixture would then pass in the conventional unit to a waste heat boiler in which the temperature would be reduced to a value in the approximately range of 170° C. to 185° C. before entering the quench column or contact condenser.

In the present scheme, however, the tailgas feed preheater (or the conventional Reducing Gas Generator, RGG), the hydrogenation reactor and the waste heat boiler (WHB) are eliminated: the tail gases from the Claus unit typically at a temperature of 130-150° C. and preferably 130-140° C., pass directly to the foot of column 11 in which they are cooled in the two stages of the column to a temperature of approximately 40-50° C. The cooling medium in the lower stage of column 11 (quench column) is provided by means of a circulating water loop which passes cooling water in countercurrent to the ascending stream of tail gas received directly from the Claus unit. In this respect, the present column, using a plain water cooling wash, differs from the conventional alkaline contact condenser in which a caustic solution is used in the lower section to remove $SO_2$ before the gases encounter the alkaline scrubber solution. A purge stream of water 35 is removed at the outlet of the circulating pump 12 in the circulation loop and a water-cooled heat exchanger 13 for the water is provided in the return leg 14 of the loop to cool the water to the required temperature, together with a filter/strainer (not shown in the FIGURE) to remove any particulates including elemental sulfur.

The cooled gases pass upwards in the column through a chimney tray 15 into the second stage of column 11 (wash column) in which they pass in countercurrent to a dilute circulating absorbent solution of a severely hindered aminoether alcohol which absorbs any $SO_2$ that is present in the tail gas from the Claus unit and further cools the gases. This solvent solution is collected from the bottom of the top section of the column in chimney tray 15 and circulated by pump 16 in circulating loop 17. A slipstream of the solution is withdrawn through line 18 at the outlet of pump 16 and sent to a thermal reclaimer 36 which recovers the amine solvent on a continuous basis and rejects any $SO_2$ or CO based heat stable salts. A slip stream of lean solution from the regenerator of the absorber section is continuously added to the loop through line 20 to maintain the concentration of the aminoether alcohol in the circulating solution.

The contacting devices in the quench column and wash column may be trays, random packing, structured packing or other contacting devices.

The gas stream from the overhead of wash column 11 passes out through line 22 to absorber column 24. The gas stream via line 22 enters at the bottom of absorber column 24 and passes upwardly in countercurrent to a descending stream of aminoether alcohol absorbent solution from regenerator 25 entering through branch line 26 which takes a majority of the regenerated solvent solution from regenerator 25 with less going to the top of wash column 11 via line 20. This stream is maintained with a higher concentration of the amine than the dilute stream in wash column 11. The hydrogen sulfide in the gas stream is absorbed by the aminoether alcohol in the absorbent solution which passes out from the bottom of column 24 via line 28 and passes to regenerator 25 by way of heat exchanger 30 in which it is brought to the required regeneration temperature by the returning solvent solution from the foot of regenerator 25 in line 27. Regeneration of the aminoether alcohol in the absorbent solution is preferably carried out by heating and stripping and more preferably heating and stripping with steam. A reboiler 37 with steam heat is provided to regenerate the solution to the desired residual $H_2S$ loading.

The acid gas from the regenerator, mainly $H_2S$, is collected from overhead receiver 31 and returned to the front of the Claus unit through line 32. The scrubbed gas stream from the overhead of absorber column 24 is passed through line 33 to incinerator 34 and then vented through a stack.

The quench column in the lower portion of column 11 may be omitted so that the gases from the Claus unit pass directly to a wash column in which a dilute solution of the aminoether alcohol is circulated in countercurrent to the gas stream; in this case, the column may comprise only one packed bed over which circulation of the dilute solution of the aminoether alcohol takes place. The dilute recirculating solution of the aminoether alcohol acts as a quench media as well as a sorbent for the $SO_2$ in the tailgas. A slip stream of the dilute amine solution is purged to the reclaimer from the circulation loop as noted above.

With or without the separate quench function, the present scheme enables significant savings to be effected both in capital expenditures by the elimination of the units normally licated between the end of the Claus unit and the first column (tailgas feed preheater or RGG, hydrogenation reactor and waste heat boiler) as well as in the direct operating costs for these units. At the same time, the consumption of amine in the dilute wash solution is maintained at a low level even without the reduction of the non-$H_2S$ gases in the Claus effluent: the gases entering the column contain only minor amounts of $SO_2$ and are still at a relatively high temperature, so minimizing the amount of $SO_2$ which dissolves in the quench and/or wash liquids and, in any event, the salts resulting from reaction of the amine and the $SO_2$ can be regenerated in the reclaimer to form fresh sorbent.

Operation of Claus Unit

The Claus unit is operated so as to produce a tail gas which contains at the most a minimal content of $SO_2$, below about 2000 vppm and preferably below 1000 vppm. The other sulfur components of the tail gas stream from the unit will comprise mainly $H_2S$ along with COS, $CS_2$ and sulfur vapor from the last condenser. In order to maintain the desired minimal $SO_2$ content in the tail gas stream, the Claus unit is operated "off-ratio", that is, with a ratio of $H_2S:SO_2$ higher than the normal 2:1 to ensure that the $SO_2$ is consumed as far as feasible in the Claus reaction. This result may be achieved either by reducing the combustion air to the burner of the initial thermal stage or by passing a portion of Claus feed gas around the main burner. Residual $H_2S$ in the tail gas is removed by the aminoether solvent and for this reason; slight excesses of this gas will not prove troublesome although economic considerations (solvent usage in removing $H_2S$) will indicate that careful control of the Claus unit will be of benefit. The objective, however, is to ensure removal or nearly complete removal of the $SO_2$ from the tail gas. The acid gas mixture passing to the absorber column includes $H_2S$, and may optionally include other gases such as $CO_2$, $N_2$, argon, $CH_4$, $H_2$, CO, COS.

Ethanolamine Solvent

The unit is operated using an absorbent solution containing a severely sterically hindered secondary aminoether alcohol as the solvent for the hydrogen sulfide. The term "absorbent solution" as used here includes but is not limited to solutions in which the amino compound is dissolved in a solvent selected from water or a physical absorbent or mixtures of water and physical absorbents. The term "severely sterically hindered" is used to mean that the nitrogen atom of the amino moiety is attached to one or more bulky carbon groupings. Typically, the severely sterically hindered aminoether alcohols have a degree of steric hindrance such that the cumulative $-E_s$ value (Taft's steric hindrance constant) is greater than about 1.75 as calculated from the values given for primary amines in Table V in D. F. DeTar, Journal of Organic Chemistry, 45, 5174 (1980), to which reference is made for such values. See, also, Tar et al, JACS 1976, 98 (15), 4567-4571. These alcohols may have either acyclic or cyclic moieties attached to the nitrogen atom(s) of the aminoether alcohol.

Another way of determining whether a secondary amino compound is "severely sterically hindered" is by measuring its 15N nuclear magnetic resonance (NMR) chemical shift. By such measurements it has been found that the "ordinary sterically hindered" secondary amino compounds have a 15N NMR chemical shift greater than about $\delta$+40 ppm, when a 90% by wt. amine solution in 10% by wt. $D_2O$ at 35° C. is measured by a spectrometer using liquid (neat) ammonia at 25° C. as a zero reference value. For example, 2-(2-tertiary-butylamino) propoxyethanol, 3-(tertiarybutylamino)-1-propanol, 2-(2-isopropylamino)-propoxyethanol and tertiary-butylaminoethoxyethanol had measured 15N NMR chemical shift values of $\delta$+74.3, $\delta$+65.9, $\delta$+65.7 and $\delta$+60.5 ppm, respectively, whereas the ordinary sterically hindered amine, secondary butylaminoethoxyethanol and the non-sterically hindered amine, n-butylaminoethoxyethanol had measured 15N NMR chemical shift values of $\delta$+48.9 and $\delta$35.8 ppm, respectively. When the cumulative $E_s$ values (Taft's steric hindrance constant) of these amines is plotted against the 15N NMR chemical shift values of the amino compounds mentioned above, a straight line is observed. The amino compounds analyzed as having an 15N NMR chemical shift values greater than $\delta$+50 ppm under the test conditions described above had a higher $H_2S$ selectively than those amino compounds having an 15N NMR chemical shift less than $\delta$+50 ppm. The tertiary amino compound used for comparison, methyldiethanolamine (MDEA), had a measured 15N NMR chemical shift value of $\delta$+27.4 ppm.

The general formula for the severely sterically hindered secondary aminoether alcohols which may be used as solvents is:

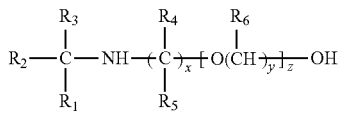

where:
R$_1$ and R$_2$ are independently selected from alkyl and hydroxyalkyl groups of 1-4 carbon atoms,
R$_3$, R$_4$, R$_5$ and R$_6$ are independently selected from hydrogen or alkyl and hydroxyalkyl groups of 1-4 carbon atoms, with the proviso that at least one of R$_4$ or R$_5$ bonded to the carbon atom which is directly bonded to the nitrogen atom is an alkyl and hydroxyalkyl group of 1-4 carbon atoms when R$_3$ is hydrogen,
x and y are each positive integers from 2 to 4 and
z is a positive integer from 1 to 4.

The preferred severely sterically hindered secondary aminoether alcohols have the formula:

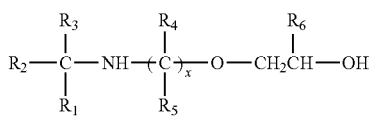

where:
R$_1$=R$_2$=R$_3$=CH$_3$; R$_4$=R$_5$=R$_6$=H;
R$_1$=R$_2$=R$_3$=CH$_3$; R$_4$=H or CH$_3$; R$_5$=R$_6$=H;
R$_1$=R$_2$=R$_3$=R$_6$=CH$_3$; R$_4$=R$_5$=H;
R$_1$=R$_2$=R$_3$=CH$_3$CH$_2$, R$_4$=R$_6$=R$_6$=H; or
R$_1$≠R$_2$≠R$_3$=H, CH$_3$, CH$_3$H$_2$, R$_4$≠R$_5$≠R$_6$=H or CH$_3$;
and x=2 or 3.

The aminoether alcohol compound is preferably one or more of the following compounds:
Tertiarybutylaminoethoxyethanol (TBEE),
2-(2-tertiarybutylamino)propoxyethanol,
tertiaryamylaminoethoxyethanol,
(1-methyl-1-ethylpropylamino)ethoxyethanol,
2-(2-isopropylamino) propoxyethanol.

These compounds and other severely hindered aminoether alcohols useful as chemical solvents for hydrogen sulfide, are described more fully, together with methods for their manufacture and use in the removal of hydrogen sulfide from gas streams are described more fully in U.S. Pat. Nos. 4,487,967; 4,471,138; 4,894,178; 4,405,585 and 4,665,234 to which reference is made for such descriptions. The severely hindered aminoether alcohols may be used in combination with other materials such as other amines preferably methyldiethanolamine, amino acids, salts, metal hydroxides; aminoalkanes, physical sorbents such as the sulfones, e.g. Sulfolane for improved solvent properties in the absorbent solution, as described in U.S. Pat. Nos. 4,508,692; 4,618,481; 4,895,670; 4,961,873; 4,112,052; 4,405,581; 4,405,585; 4,618,481; 4,961,873; 4,892,674; 4,417,075; 4,405,578, to which reference is made for descriptions of processes using these solvents.

The aminoether alcohols are characterized by their low volatility and high solubility in water at selective H$_2$S removal conditions, and most of the compounds are also generally soluble in polar organic solvent systems which may or may not contain water.

The absorbent solution used in the absorber section 23 ordinarily has a concentration of aminoether compound of about 10 wt % to 55 wt % of the total solution, and preferably 10 wt % to 45 wt %, depending primarily on the specific aminoether alcohol employed and the solvent system utilized. If the solvent system is a mixture of water and a physical absorbent, the typical effective amount of the physical absorbent employed may vary from 10 wt % to 50 wt % of total solution, depending mainly on the type of amino compound being utilized. The dependence of the concentration of aminoether alcohol on the particular compound employed is significant because increasing the concentration of the aminoether compound may reduce the basicity of the absorbent solution, thereby adversely affecting its selectivity for H$_2$S removal, particularly if the aminoether alcohol selected has a specific aqueous solubility limit which will determine maximum concentration levels within the range given above. It is important, therefore, that the proper concentration level appropriate for each particular aminoether alcohol be maintained to ensure satisfactory results. The solution in the wash column is more dilute, typically with the aminoether at about 0.5 wt % to 15 wt % of the total solution, and preferably 1 wt % to 10 wt %, again depending primarily on the specific aminoether alcohol employed. The requisite dilution is maintained by adding water to loop 17 upstream of pump 16 to replace the water lost in the purge stream.

The concentration of the aminoether alcohol circulating in the coolant solution in the upper stage of the quench column is not as great as in the absorber column since the main objective here is to cool the gas stream. The concentration of the aminoethoxy compound is selected so as to maintain the solution in the column at a slightly alkaline condition (pH at least 8) to neutralize any SO$_2$ slippage from the Claus unit. If the SO$_2$ concentration in the tail gas is maintained at the recommended long term average level of 1,000 ppm maximum, a concentration of about 0.5 wt % to 7 wt % and preferably 1 wt % to 4 wt % in the circulating coolant wash will be sufficient to remove trace amounts of SO$_2$. Control of the concentration is effected by adjustment of the make-up rate of regenerated solvent entering through line 20.

The absorbent solution may include a variety of additives typically employed in selective gas removal processes, e.g., antifoaming agents, anti-oxidants, corrosion inhibitors, and the like. The amount of these additives will typically be in the range that they are effective in the system in use.

The aminoether compounds used in the present process have a pKa value at 20° C. greater than 8.6, preferably greater than about 9.5 and more preferably the pKa value of the amino compound will range between about 9.5 and about 10.6. If the pKa is less than 8.6 the reaction with H$_2$S is decreased, whereas if the pKa of the amino compound is much greater than about 10.6, an excessive amount of steam is required to regenerate the solution. To ensure operational efficiency with minimal losses of the amino compound, the amino compound should have a relatively low volatility and, in general, the alkoxylated amino alcohols are selected to have volatilities such that their boiling points are above 180° C. (760 mm Hg) and generally above 200° C. and more above 225° C.

Unit Operation

In a typical mode of operation, the absorption step is conducted by feeding the gaseous stream from the quench column into the lower portion of the absorption column while fresh absorbent solution is fed into the upper region of the column. The normally gaseous mixture, freed largely from the H$_2$S, emerges from the upper portion of the column, and the loaded absorbent solution, which contains the selectively absorbed H₂S, leaves the column near or at its bottom. The inlet temperature of the absorbent solution during the absorption step is preferably in the range of from about 20° to about 100° C., and more preferably from 35° to about 60° C. Pressures in the absorber may vary widely; acceptable pressures are between 1 to 80 bara, preferably 1 to 20 bara, although good results may be achieved by operating at significantly lower pressures from 1.02 to 3 bara. The amount of absorbent solution and concentration required to be circulated to obtain a given degree of H₂S removal will depend on the chemical structure and basicity of the amino compound and on the partial pressure of H₂S in the feed gas. Gas mixtures with low partial pressures will require more liquid under the same absorption conditions than gases with higher partial pressures.

A typical procedure for the H₂S removal phase contacts the gas stream with the aqueous absorbent solution in a column containing a number of trays at a low temperature, e.g., below 45° C. and at a gas velocity of at least about 10 cm/sec. (based on "active" or aerated tray surface). Depending on the operating pressure of the gas, the tray column will typically have fewer than 24 contacting trays, with, e.g., 4-16 trays typically employed. The Mass Transfer Equivalent volume of random packing, structured packing or other contacting devices maybe utilized to achieve the same degree of H2S absorption.

After contacting the gaseous mixture, the absorbent solution becomes saturated or partly saturated with H₂S and is at least partly regenerated so that it may be recycled back to the absorber. As with absorption, the regeneration may take place in a single liquid phase. Regeneration or desorption of the acid gases from the absorbent solution may be accomplished by conventional means such as pressure reduction of the solution or increase of temperature to a point at which the absorbed H₂S flashes off, or by passing the solution into a vessel of similar construction to that used in the absorption step, at the upper portion of the vessel, and passing an inert gas such as air nitrogen or, more preferably, steam, upwardly through the vessel. The temperature of the solution during the regeneration step should be in the range from about 50° to about 170° C., and preferably from about 100° to 130° C., and the pressure of the solution during regeneration should range from about 1.05 to 3.1 bar abs., preferably 2-2.75 bar abs. The absorbent solution, after being cleansed of at least a portion of the H₂S gas, is then recycled back to the absorbing vessel with a minority stream being taken to the upper stage of the quench column to replenish losses in that stage of the process. Makeup absorbent may be added as needed.

In the preferred regeneration technique, the H₂S-rich solution is sent to the regenerator where the absorbed components are stripped by the steam which is generated by re-boiling the solution. Pressure in the stripper is usually 1.05-3.1 bar abs. preferably 2-2.75 bar abs. and the temperature is typically in the range from about 50° to 170° C., preferably about 100 to 130° C. Stripper and flash temperatures will, of course, depend on stripper pressure; thus at about 1 to 2 bar abs. stripper pressures, the temperature will be about 100° to about 120° C. during desorption. Heating of the solution to be regenerated may suitably be effected by means of indirect heating with low-pressure steam. It is also possible, however, to use direct injection steam.

The purge stream of dilute coolant solution removed from the circulation loop of the upper stage of the quench column can be reclaimed in a simple, atmospheric pressure thermal reclamation process after reaction with SO₂ whereas other amines such as MDEA require more vacuum treatment in a rather expensive unit to remove heat stable salts formed by reaction with SO₂ and CO₂. The conditions in the thermal reclaimer are in 90° to 170° C., preferably 130° to 150° C. This temperature is achieved by heating with medium pressure steam. Measured volumes of caustic are added to release the amine from the heat stable salt. The sodium salts thus produced are then purged from the reclaimer periodically. The use of the separate circulation loop for the combined coolant/solvent in the upper stage of the quench column enables the small amounts of SO₂ to be removed separately from the larger quantities of H₂S in the absorber column and precludes the accumulation of heat stable salts in the absorber circuit which are not removed in the regeneration step. Alternately, other reclaiming techniques, such as, ion exchange or dialysis may also be used.

The invention claimed is:

1. A process for the removal of hydrogen sulfide from a tail gas stream from a Claus plant which comprises H₂S and less than 2000 vppm SO₂, which comprises:
   (i) contacting the tail gas stream with a circulating stream of a dilute, absorbent solution of a severely sterically hindered aminoether alcohol to cool the gas stream and remove SO₂ from the gas stream,
   (ii) contacting the cooled gas stream from step (i) with a stronger absorbent solution of a severely sterically hindered aminoether alcohol to remove H₂S from the gas stream.

2. A process according to claim 1 in which the tail gas stream from the Claus plant comprises less than 1000 vppm SO₂.

3. A process according to claim 2 in which the tail gas stream from the Claus plant is at a temperature of 130 to 150° C. when contacting the circulating stream of the dilute absorbent solution.

4. A process according to claim 1 in which the tail gas stream from the Claus plant is initially cooled by contact with a stream of water as a coolant prior to contact with the circulating stream of the dilute absorbent solution.

5. A process according to claim 3 in which the tail gas stream from the Claus plant is at a temperature of 130 to 140° C. when entering step (i).

6. A process according to claim 1 in which the severely sterically hindered aminoether alcohol of the absorbent solutions is a secondary aminoether alcohol of the formula:

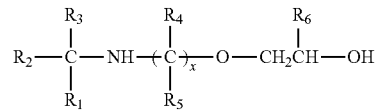

where:
R₁=R₂=R₃=CH₃; R₄=R₅=R₆=H;
R₁=R₂=R₃=CH₃; R4=H or CH₃; R₅=R₆=H;
R₁=R₂=R₃=R₆=CH₃; R₄=R₅=H;
R₁=R₂=R₃=CH₃CH₂; R₄=R₅=R₆=H; or
R₁≠R₂≠R₃=H, CH₃, CH₃H₂; R4≠R5≠R6=H or CH₃;
and x=2 or 3.

7. A process according to claim 6 in which the severely sterically hindered secondary aminoether alcohol of the absorbent solutions comprises tertiary-butylamino-ethoxyethanol, 2-(2-tertiarybutylamino)propoxyethanol, tertiaryamylaminoethoxyethanol, (1-methyl-1-ethylpropylamino) ethoxyethanol or 2-(2-isopropylamino)propoxyethanol.

8. A process according to claim 1 in which the dilute absorbent solution of step (i) has a concentration of aminoether alcohol of about 0.5 wt % to 15 wt % of the total solution.

9. A process according to claim 1 in which the stronger absorbent solution of step (ii) has a concentration of aminoether alcohol of about 10 wt % to 55 wt % of the total solution.

10. A process according to claim 1 in which the inlet temperature of the stronger absorbent solution during the absorption of step (ii) is from 40° to 60° C. and the pressure during the absorption of step (ii) is from 1.02 to 3 bara.

11. A process according to claim 1, in which a purge stream of the dilute absorbent solution of the severely sterically hindered aminoether alcohol from step (i) is processed to recover the severely sterically hindered aminoether alcohol.

12. A process according to claim 11, in which a purge stream of the dilute absorbent solution of a severely sterically hindered aminoether alcohol from step (i) is processed in a thermal reclaimer to recover the severely sterically hindered aminoether alcohol.

13. A process for the removal of hydrogen sulfide from a gas stream, which comprises:
  (i) subjecting the hydrogen sulfide-containing gas to the Claus reaction to convert hydrogen sulfide to sulfur and form a tail gas stream comprising $H_2S$ and less than 2000 vppm $SO_2$,
  (ii) cooling the tail gas stream by contact with a stream of water as a coolant,
  (iii) contacting the gas stream from step (ii) with a circulating stream of a dilute, absorbent solution of a severely sterically hindered aminoether alcohol to further cool the gas stream and to remove $SO_2$ from the gas stream,
  (iv) contacting the gas stream from step (iii) with a stronger absorbent solution of a severely sterically hindered aminoether alcohol to remove $H_2S$ from the gas stream.

14. A process according to claim 13 in which the Claus process comprising the reaction of $H_2S$ and $SO_2$ is operated at a ratio of higher than 2:1 ($H_2S:SO_2$) to produce elemental sulfur and a tail gas stream comprising $H_2S$ and less than 2000 vppm $SO_2$.

15. A process according to claim 14 in which the tail gas stream from the Claus plant comprises less than 1000 vppm $SO_2$.

16. A process according to claim 13 in which the tail gas stream from the Claus plant is at a temperature of 130 to 150° C. when entering step (ii).

17. A process according to claim 15 in which the gas stream from step (iii) is at a temperature of 40 to 60° C. when entering step (iv).

18. A process according to claim 13 in which the severely sterically hindered aminoether alcohol of the absorbent solutions has the formula:

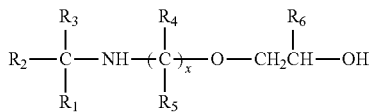

where:
  $R_1=R_2=R_3=CH_3$; $R_4=R_5=R_6=H$;
  $R_1=R_2=R_3=CH_3$; $R4=H$ or $CH_3$; $R_5=R_6=H$;
  $R_1=R_2=R_3=R_6=CH_3$; $R_4=R_5=H$;
  $R_1=R_2=R_3=CH_3CH_2$; $R_4=R_5=R_6=H$; or
  $R_1 \ne R_2 \ne R_3=H, CH_3, CH_3H_2$; $R4 \ne R5 \ne R6=H$ or $CH_3$;
  and x=2 or 3.

19. A process according to claim 18 in which the severely sterically hindered aminoether alcohol of the absorbent solutions comprises tertiary-butylamino-ethoxyethanol, 2-(2-tertiarybutylamino)propoxyethanol, tertiaryamylaminoethoxyethanol, (1-methyl-1-ethylpropylamino)ethoxyethanol or 2-(2-isopropylamino)propoxyethanol.

20. A process according to claim 13 in which the dilute absorbent solution of step (iii) has a concentration of aminoether alcohol of about 0.5 wt % to 15 wt % of the total solution and the stronger absorbent solution of step (iv) has a concentration of aminoether alcohol of about 10 wt % to 55 wt % of the total solution.

21. A process according to claim 13 in which the inlet temperature of the dilute absorbent solution during the absorption of step (iii) is from 40° to 60° C. and the pressure during the absorption of step (iii) is from 1.02 to 3 bara.

22. A process according to claim 13, in which a purge stream of the dilute absorbent solution of a severely sterically hindered aminoether alcohol from step (iii) is processed to recover the severely sterically hindered aminoether alcohol.

23. A process according to claim 22, in which a purge stream of the dilute absorbent solution of a severely sterically hindered aminoether alcohol from step (iii) is processed in a thermal reclaimer to recover the severely sterically hindered aminoether alcohol.

24. A process for the removal of hydrogen sulfide from a gas stream, which comprises:
  (i) subjecting the hydrogen sulfide-containing gas to the Claus reaction to convert hydrogen sulfide to sulfur and form a tail gas stream comprising $H_2S$ and less than 1000 vppm $SO_2$ at a temperature of 130 to 150° C.,
  (ii) cooling the tail gas stream to a temperature of 40-60° C. by countercurrent direct contact with cooling water circulating in a quench column having a cooling water circulation loop,
  (iii) contacting the gas stream from step (ii) in countercurrent with a circulating stream of a dilute, absorbent solution of a severely sterically hindered secondary aminoether alcohol in a quench column having a circulation loop for the dilute absorbent solution to further cool the gas stream and remove $SO_2$ from the gas stream, and separating the further cooled gas stream from the dilute absorbent solution,
  (iv) contacting the separated, cooled gas stream from step (iii) in countercurrent with a stronger circulating absorbent solution of a severely sterically hindered secondary aminoether alcohol in an absorber column having a circulation loop for the stronger circulating absorbent solution to remove $H_2S$ from the gas stream by absorption into the stronger absorbent solution to form a purified gas stream and separating the purified gas stream from the stronger absorbent solution,
  (v) regenerating the stronger absorbent solution by steam stripping in a regeneration zone.

25. A process according to claim 24 in which the stronger absorbent solution of step (iv) has a concentration of aminoether alcohol of 10 wt % to 55 wt % of the total solution and the dilute absorbent solution of step (iii) has a lower concentration of 0.5 wt % to 15 wt % of the total dilute solution.

26. A process according to claim 24 in which the dilute absorbent solution of step (iii) has a pH of at least 8.

27. A process according to claim 24 in which the stronger absorbent solution from step (iv) is regenerated as in step (v) by steam stripping at a pressure from 0.5 to 3 bara.

28. A process as according to claim 24, in which a purge stream of the dilute absorbent solution of a severely sterically hindered aminoether alcohol from step (iii) is processed to recover the severely sterically hindered aminoether alcohol.

29. A process according to claim 28, in which a purge stream of the dilute absorbent solution of a severely sterically hindered aminoether alcohol from step (iii) is processed in a thermal reclaimer to recover the severely sterically hindered aminoether alcohol.

30. A process for the removal of hydrogen sulfide from a tail gas stream from a Claus plant which comprises:
(i) passing the tail gas stream from the Claus plant without the addition of hydrogen into contact with a circulating stream of a dilute, absorbent solution of a severely sterically hindered aminoether alcohol to cool the gas stream and to remove $SO_2$ from the gas stream, (ii) contacting the cooled gas stream from step (i) with a stronger absorbent solution of a severely sterically hindered aminoether alcohol to remove $H_2S$ from the gas stream.

31. A process according to claim 30 in which the tail gas stream from the Claus plant comprises less than 1000 vppm $SO_2$.

32. A process according to claim 30 in which the tail gas stream from the Claus plant is at a temperature of 130 to 150° C. when entering step (i).

33. A process according to claim 30 in which the tail gas stream from the Claus plant is initially cooled by contact with a stream of water as a coolant prior to contact with the circulating stream of the absorbent solution.

34. A process according to claim 30 in which the severely sterically hindered aminoether alcohol of the absorbent solutions has the formula:

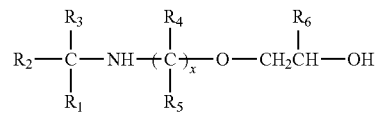

where:
$R_1=R_2=R_3=CH_3$; $R_4=R_5=R_6=H$;
$R_1=R_2=R_3=CH_3$; $R4=H$ or $CH_3$; $R_5=R_6=H$;
$R_1=R_2=R_3=R_6=CH_3$; $R_4=R_5=H$;
$R_1=R_2=R_3=CH_3CH_2$, $R_4=R_5=R_6=H$; or
$R_1 \neq R_2 \neq R_3 = H, CH_3, CH_3H_2$; $R4 \neq R5 \neq R6 = H$ or $CH_3$;
and x=2 or 3.

* * * * *